July 8, 1924.  1,500,651
W. R. SMITH
GLASS MAKING APPARATUS
Filed Jan. 28, 1920  3 Sheets-Sheet 1
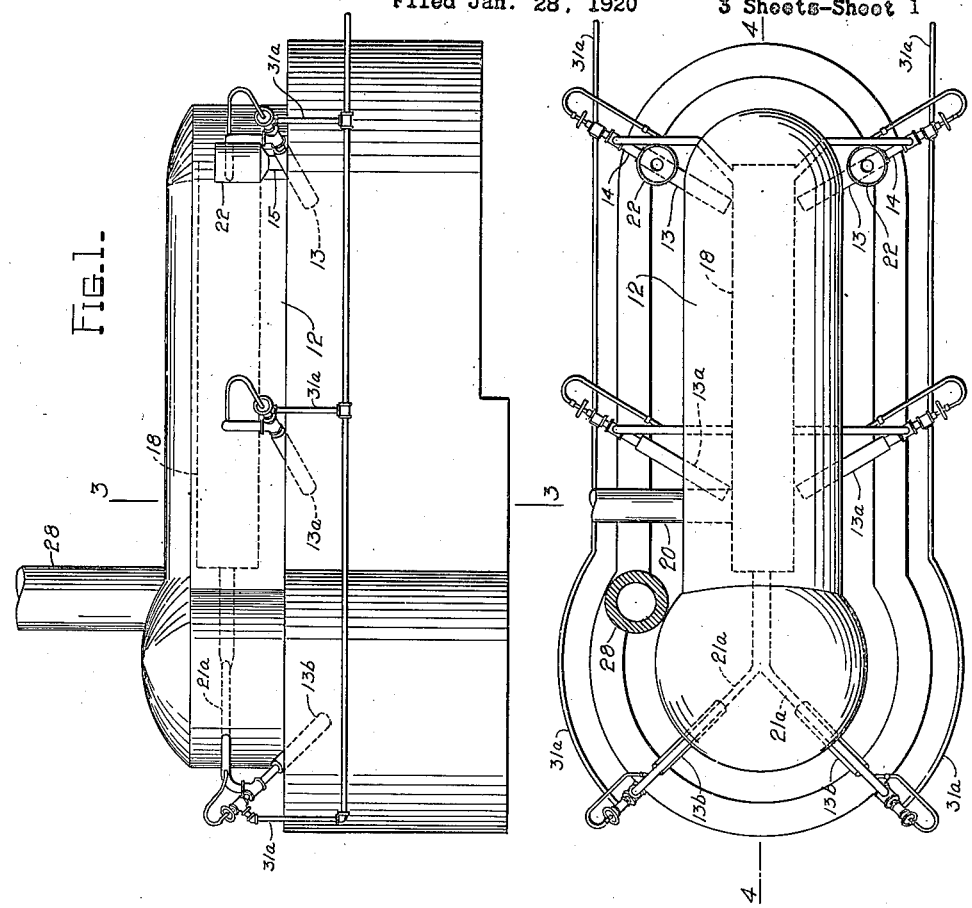
INVENTOR
WILLIAM R SMITH
by Wright Brown Quinby May
ATTYS.
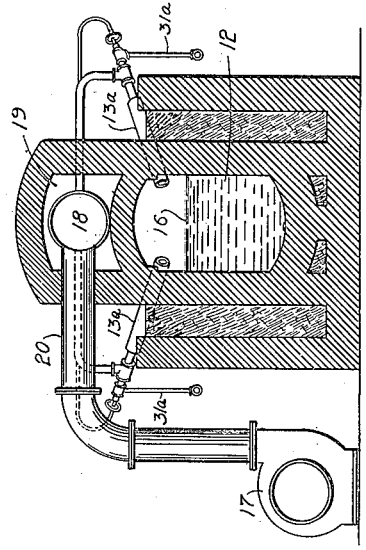

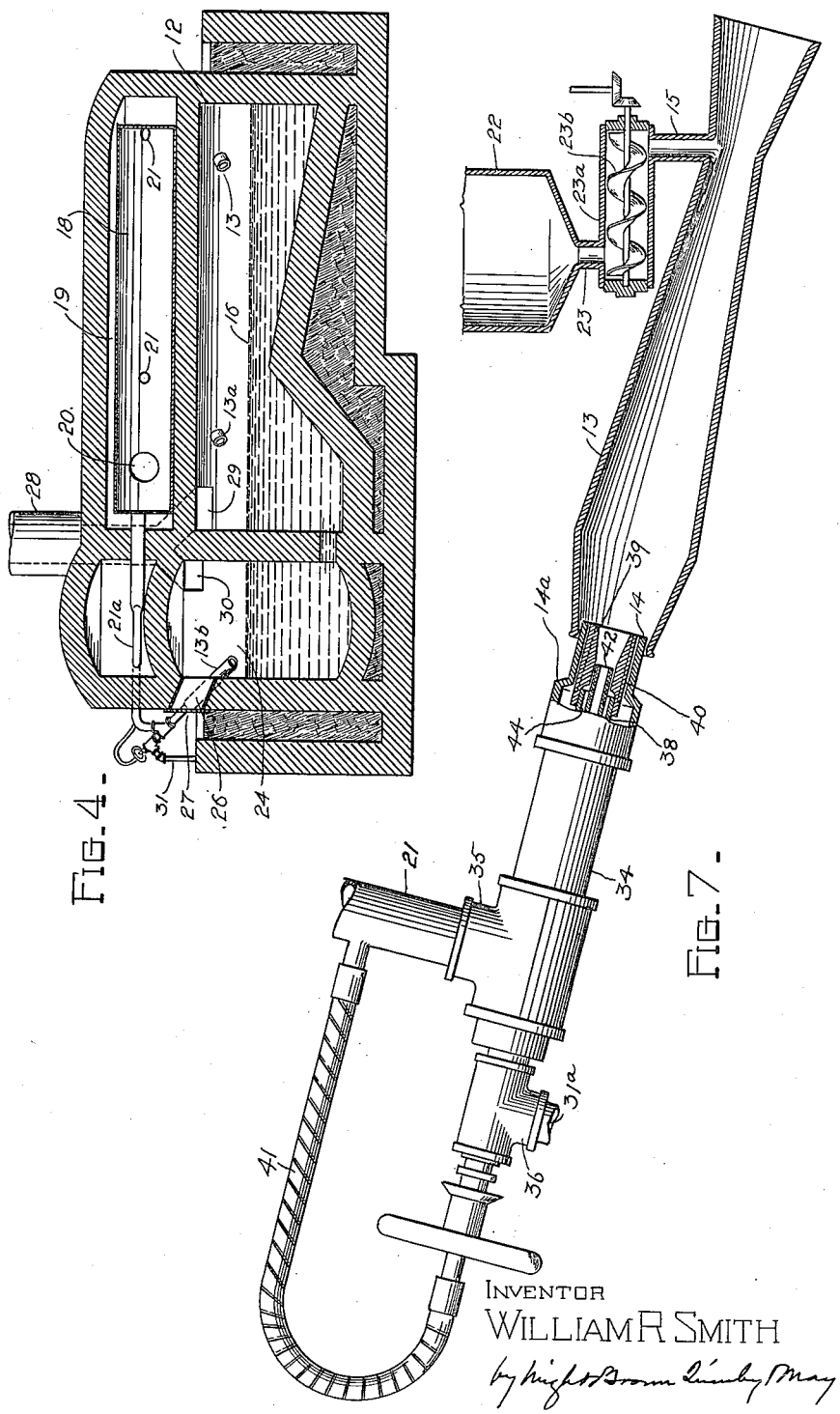

July 8, 1924.
W. R. SMITH
1,500,651
GLASS MAKING APPARATUS
Filed Jan. 28, 1920   3 Sheets-Sheet 3
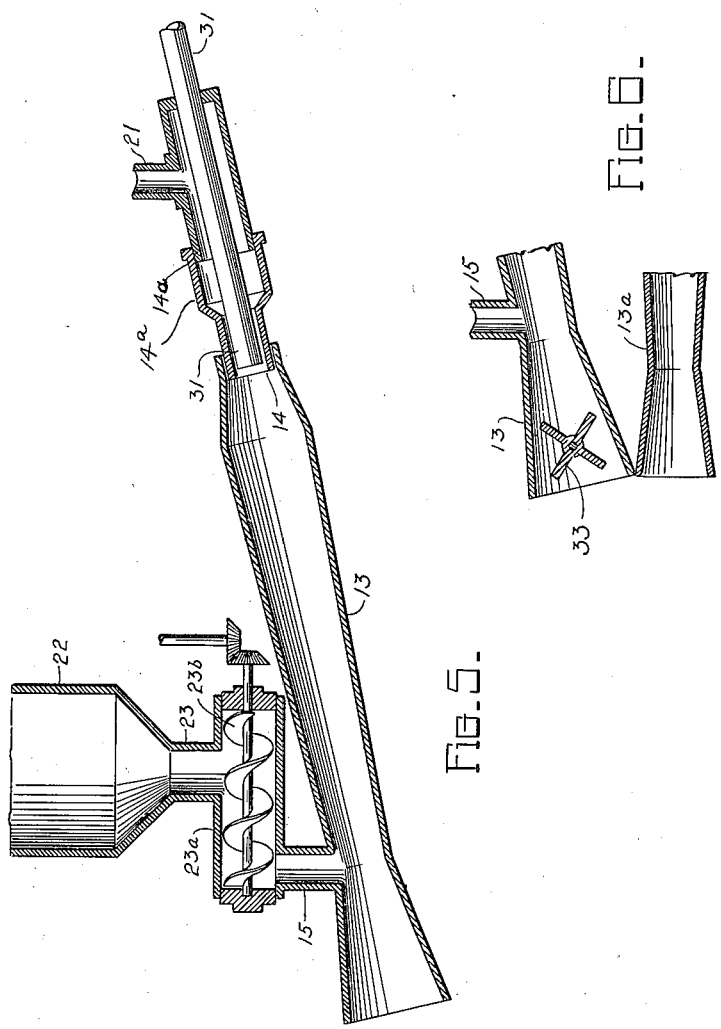
INVENTOR
WILLIAM R SMITH
ATTYS Patented July 8, 1924.

1,500,651

UNITED STATES PATENT OFFICE.

WILLIAM R. SMITH, OF BUFFALO, NEW YORK.

GLASS-MAKING APPARATUS.

Application filed January 28, 1920. Serial No. 354,619.

*To all whom it may concern:*

Be it known that I, WILLIAM R. SMITH, a citizen of the United States, residing at Buffalo, in the county of Erie and State of New York, have invented new and useful Improvements in Glass-Making Apparatus, of which the following is a specification.

This invention has for its object to provide a continuously operating apparatus for feeding the raw materials used in making glass in a stream, or in a plurality of independent streams, to a glass-accumulating tank, and melting the materials of each stream within the tank.

The invention is embodied in the improvements which I will now proceed to describe and claim.

Of the accompanying drawings forming a part of this specification,—

Figure 1 is a side elevation of an apparatus embodying the invention.

Figure 2 is a top plan view of the same.

Figure 3 is a section on line 3—3 of Figure 1.

Figure 4 is a section on line 4—4 of Figure 2.

Figure 5 is an enlarged sectional view, showing portions of the apparatus.

Figure 6 shows in section, a portion of one of the twyers and a mechanical feeding device therein.

Figure 7 is a view showing in section, one of the twyers shown by preceding figures, and partly in section and partly in elevation, another form of means for delivering air and gas to the twyer.

The same reference characters indicate the same parts in all of the figures.

My improved apparatus includes a structure forming a closed tank 12, which is preferably oblong, its length considerably exceeding its width, as indicated by Figures 3 and 4.

Extending through upright walls of the tank are a plurality of elongated melting twyers 13, each constituting a mixing chamber and a conduit, and each receiving a nipple 14 at its outer end, and having a supply conduit 15 (Figure 5) between its ends for the reception of the glass ingredients.

The apparatus includes means for continuously delivering a mixture of compressed air and combustible gas, and means for continuously delivering glass ingredients, to the melting twyer.

The air and gas-delivering means preferably includes the nipple 14 entering the outer end of the twyer 13, and a gas pipe 31. The nipple 14 forms a part of a casing 14ª surrounding the gas pipe 31.

The compressed air and gas are mixed in the twyer and ignited at the inner end thereof, said end constituting a burner located above the bottom of the tank, the flame being projected forcibly from the twyer into the tank. A mixture of comminuted raw materials used in making glass, is admitted to the melting twyer, in the path of the gas and air, said materials or ingredients being projected into the tank and melted by the flame. The operation of each twyer 13 is like that of the other, so that each projects a flame and a stream of glass ingredients into the tank, wherein a body 16 of molten glass is accumulated. The hot products of combustion delivered to the twyers continuously heat the tank to maintain glass therein at a suitable temperature above the melting point.

I prefer to supply the air by a blower 17, an air-conducting main 18, enclosed in the tank structure, and preferably in an independent chamber 19, above the tank and separated therefrom by a heat-conducting partition, a conduit 20 connecting the blower with the main 18, and conduits 21 connecting the main with the casing 14ª. The air supplied is, therefore, suitably heated.

I prefer to embody the means for delivering the glass ingredients to each melting twyer in a hopper 22, adapted to contain the ingredients or raw materials, and a conduit 23 extending from the bottom portion of said hopper. The conduit 23 may be offset from the conduit 15, and connected therewith by a conduit portion 23ª, in which is a conveyor 23ᵇ which may be a helical blade, rotated by any suitable means, to feed the ingredients at a predetermined rate to the twyer. While the apparatus may include only one melting twyer 13, I prefer to employ two twyers, as shown by Figures 2 and 3.

The melting twyers are preferably downwardly inclined from their outer to their inner ends, and are arranged to project the burner flames in different directions and cause them to meet at a common point. The glass ingredients are more quickly melted by this arrangement than would be the case if the flames did not meet. The downward inclination of the twyers causes the flames to impinge on the surface of the body of glass in the tank. The tank is preferably provided with additional heating twyers 13ª, which, like the twyers 13, receive gas and air, but do not receive glass ingredients, these twyers directing their flames upon the body of molten glass in the tank.

The tank structure includes a gathering chamber 24, communicating with the tank through a passage 25, and provided with a suitable opening 26 through which glass may be removed from the gathering chamber as required, said opening being provided with a suitable closure 27.

To maintain the glass in the gathering chamber at a suitable temperature, I provide a heating twyer 13ᵇ, or preferably two or more of said heating twyers, extending through the upright wall of the gathering chamber and having the same function as the twyers 13ª. The twyer 13ᵇ is connected by an air conduit 21ª with the air main 18. The twyer 13ᵇ directs its flame on the surface of the body of glass in the gathering chamber.

28 represents a chimney connected with the structure and having an intake 29, communicating with the upper portion of the tank 12, and an intake 30 communicating with the upper portion of the gathering chamber, so that the chimney provides an outlet for the products of combustion from the tank and from the chamber.

The several gas pipes 31 are connected by a suitable pipe line or lines 31ª with a source of gas supply.

The tank structure may be preliminarily heated by the twyers before the glass ingredients are delivered.

If desired, a mechanical feeding device may be installed in the twyer 13, to force, or aid in forcing the glass ingredients into the tank. Said device may be a wheel 33 (Figure 6) composed of a hub and blades radiating therefrom, the hub being journaled in the twyer between the conduit 15 and the inner end of the twyer, and rotated by any suitable means.

When the twyer 13 is equipped with a mechanical feeding device, the melting flame may be projected by a twyer 13ª into the stream of ingredients after said stream has left the twyer 13, in which case the twyer 13 may or may not be supplied with a mixture of gas and air, and may or may not constitute a mixing chamber and a burner.

The means for delivering air and gas to the twyer 13 may be constructed as shown by Figure 7, in which the casing 14ª having the nipple 14 projecting into the outer end of the twyer, has an extension 34 which has a branch 35, receiving the air conduit 21, and another branch 36 at its outer end portion, receiving one of the members 31ª of the gas pipe line. A gas pipe 38 extends from the branch 36 to a nozzle 39 within the nipple 14, and is spaced from the latter to provide an annular air passage 40, through which air entering at the branch 35 passes to the twyer 13. A branch air conduit extends from the conduit 21 into the nozzle 39, and through the gas pipe 38, said branch conduit including a curved air pipe 41 and a straight air pipe 42, the latter entering the nozzle 39. The air pipe 42 is separated from the gas pipe 38 to form an annular passage 44 through which gas enters the nozzle 39.

An annular stream of gas is delivered by the passage 44 between an outer annular stream of air delivered by the passage 40, and an inner stream of air delivered by the pipe 42. Provision is therefore made for mixing the air and gas at the point where they enter the twyer 13. Said twyer may be tapered as shown by Figures 5 and 7, to constitute a Venturi tube.

I claim:

1. A glass-making apparatus comprising a closed tank formed to confine a body of molten glass, an elongated tubular melting twyer extending through the wall of the tank, the inner end of the twyer constituting a burner located within the tank above the bottom thereof, means for admitting gas and air under pressure to the outer end portion of the twyer, and means for delivering glass materials to the flame resulting from combustion at said burner, so that said materials may be projected into the tank, melted by the burner flame and accumulated in a molten condition in the tank below said burner.

2. A glass-making apparatus comprising a closed tank formed to confine a body of molten glass, an elongated tubular melting twyer extending through the wall of the tank, the inner end of the twyer constituting a burner located within the tank above the bottom thereof, means for admitting gas and air under pressure to the outer end portion of the twyer and means for admitting glass materials to the twyer between its ends so that said materials may be projected into the tank, melted by the burner flame, and accumulated in a molten condition in the tank below said burner.

3. A glass-making apparatus comprising a closed tank formed to confine a body of molten glass, a plurality of elongated tubular melting twyers extending through the wall of the tank, the inner ends of the twyers constituting burners located within the tank above the bottom of the latter, means for admitting gas and air under pressure to the outer end portions of the twyers, and means for delivering glass materials to the flame resulting from combustion at said burners so that said materials may be projected into the tank, melted by the burner flame and accumulated in a molten condition in the tank below said burners, the twyers being inclined and relatively arranged to cause the jets of flame, and the materials melted thereby, to impinge at a common meeting point on the surface of an accumulation of molten glass in the tank.

4. A glass-making apparatus, substantially as specified by claim 1, comprising also an elongated tubular heating twyer extending through the wall of the tank, the inner end of the melting twyer constituting a burner located within the tank above the bottom thereof and means for admitting gas and air under pressure to the outer end portion of the melting twyer, the said heating twyer being arranged to project a heating flame upon the surface of an accumulation of molten glass in the tank.

5. A glass-making apparatus substantially as specified by claim 1, comprising also an independent air-heating chamber separated by a partition from the tank and adapted to be warmed by heat conducted through said partition from the tank, and an air conduit passing through said chamber and constituting an element of means for supplying air under pressure to the said twyer.

6. In a glass-making apparatus, a twyer adapted to receive glass ingredients and provided with a mechanical device for forcing said ingredients from the twyer.

In testimony whereof I have affixed my signature.

WILLIAM R. SMITH.